(12) United States Patent
Fullenkamp et al.

(10) Patent No.: US 12,335,259 B2
(45) Date of Patent: Jun. 17, 2025

(54) SYSTEMS AND METHODS FOR AUTOMATED CONFIGURATION OF COMMUNICATIONS EQUIPMENT

(71) Applicant: Level 3 Communications, LLC, Broomfield, CO (US)

(72) Inventors: Timothy Fullenkamp, Broomfield, CO (US); Majdi Dawud, Lafayette, CO (US); Erik McLeod, Longmont, CO (US); Russell Richardson, Thornton, CO (US); Alexander Talavera, Broomfield, CO (US)

(73) Assignee: Level 3 Communications, LLC, Denver, CO (US)

( * ) Notice: Subject to any disclaimer, the term of this patent is extended or adjusted under 35 U.S.C. 154(b) by 540 days.

(21) Appl. No.: 17/935,626

(22) Filed: Sep. 27, 2022

(65) Prior Publication Data

US 2023/0171249 A1   Jun. 1, 2023

Related U.S. Application Data

(60) Provisional application No. 63/284,079, filed on Nov. 30, 2021.

(51) Int. Cl.
*H04L 41/082* (2022.01)
*H04L 9/40* (2022.01)

(52) U.S. Cl.
CPC ........ *H04L 63/0876* (2013.01); *H04L 41/082* (2013.01); *H04L 63/20* (2013.01)

(58) Field of Classification Search
CPC ... H04L 63/0876; H04L 41/082; H04L 63/20; H04L 41/0843; H04L 41/0866; H04L 41/0886; H04L 43/50; H04L 41/0806; H04L 41/0853
USPC ........................................................ 709/224
See application file for complete search history.

(56) References Cited

U.S. PATENT DOCUMENTS

| | | | |
|---|---|---|---|
| 8,797,912 B2 * | 8/2014 | Pollakowski | H04L 61/50 370/254 |
| 10,938,855 B1 * | 3/2021 | Waldie | G06F 21/575 |
| 11,153,155 B1 * | 10/2021 | Perez | H04L 41/0809 |
| 11,452,176 B1 * | 9/2022 | Salkini | H04W 76/16 |
| 2014/0016479 A1 * | 1/2014 | Coomber | H04L 43/50 370/252 |
| 2014/0298422 A1 * | 10/2014 | Odajima | H04L 9/0833 726/4 |
| 2015/0242747 A1 * | 8/2015 | Packes | G06N 3/045 706/17 |
| 2016/0373944 A1 * | 12/2016 | Jain | H04M 3/2236 |
| 2017/0364702 A1 * | 12/2017 | Goldfarb | H04L 63/1408 |
| 2018/0034698 A1 * | 2/2018 | Perez | H04L 41/0886 |
| 2018/0048555 A1 * | 2/2018 | Doshi | H04L 67/303 |
| 2018/0220312 A1 * | 8/2018 | Guttenfelder | G01S 19/23 |

(Continued)

*Primary Examiner* — Karen C Tang

(57) ABSTRACT

A field device, including: a processor; and memory including instructions that, when executed by the processor, cause the processor to: login to a local node device physically connected to the field device; enable a common command protocol on the local node device; solicit information to configure the local node device; generate a command set in the enabled common command protocol according to the solicited information; and execute the command set to automatically commission the local node device to communicate with one or more other node devices commissioned in a first network.

17 Claims, 13 Drawing Sheets

(56) References Cited

U.S. PATENT DOCUMENTS

| | | | |
|---|---|---|---|
| 2020/0162328 A1* | 5/2020 | Valenza | H04L 41/0806 |
| 2020/0364525 A1* | 11/2020 | Mats | G06K 19/0717 |
| 2021/0153041 A1* | 5/2021 | Parvataneni | H04L 43/065 |
| 2022/0294691 A1* | 9/2022 | Kumar Skand Priya | G06F 8/60 |
| 2024/0089413 A1* | 3/2024 | Maggiore | G06F 21/31 |

* cited by examiner

| Field | Value |
|---|---|
| 602 User Name | Admin |
| 604 Password | •••••• |
| 606 TID | LAVSDRFDCOADVAR7CLVB12 |
| 608 SID | FSP3000 |
| 610 Contact No. | TNOC 877-123-4567 |
| 612 Location/Room/Rack | R1.01 |
| 614 Node IP | 100.80.32.12 |
| 616 Subnet Mask | 255.255.255.0 |
| 618 Default Gateway | 100.80.32.254 |
| 620 OSCMPN Slot | 4 |

[View/Edit]  [Execute]  [Cancel]

| System | Node Place OSFM | AMP | Card | Size if pad in I port | Level In | Size of pad in D port | Level Out |
|---|---|---|---|---|---|---|---|
| 80 CH Yes | 0 | Yes | 2WCA-PCN-10G | 5 | -4.5 | 13 | -14 |
| 80 CH Yes | 1 | Yes | 2WCC-PCN-10G | 5 | -4.5 | 13 | -14 |
| 40 CH No | 0 | No | 4WCC-PCN-10G | 3 | -2 | Measure Light | -14 |
| 40 CH No | 1 | Yes |  | 3 | -2 | 13 | -14 |
| 80 CH Yes | 0 | Yes | 2TWCC-PCN-2G7U | 9 | -4.5 | 15 | -17 |
| 80 CH Yes | 1 | Yes |  | 9 | -4.5 | 15 | -17 |
| 40 CH No | 0 | No |  | 6 | -2 | Measure Light | -17 |
| 40 CH No | 1 | Yes |  | 6 | -2 | 15 | -17 |
| 80 CH Yes | 0 | Yes | WCC-PCN-100G | 4 | -4.5 | 7 | -10 |
| 80 CH Yes | 1 | Yes | WCC-PCN-100GB | 4 | -4.5 | 7 | -10 |
| 40 CH No | 0 | No | N-CFP=1061700619-02 | 2 | -2 | Measure Light | -10 |
| 40 CH No | 1 | Yes |  | 2 | -2 | 13 | -10 |
| 80 CH Yes | 0 | Yes | WCC-PCN-100G | 5 | -4.5 | tbd | tbd |
| 80 CH Yes | 1 | Yes | WCC-PCN-100GB | 5 | -4.5 | Measure Light | tbd |
| 40 CH No | 0 | No | N-CFP=1061700655-02 | 2 | -2 | tbd | tbd |
| 40 CH No | 1 | Yes |  | 2 | -2 | Measure Light | tbd |
| 80 CH Yes | 0 | Yes | WCC-PCN-100G | 5 | -4.5 | 3 | -5 |
| 80 CH Yes | 1 | Yes | N-CFP=1061700620-01 | 5 | -4.5 | 3 | -5 |
| 40 CH No | 0 | No |  | 2 | -2 | Measure Light | -5 |
| 40 CH No | 1 | Yes |  | 2 | -2 | 3 | -5 |
| 80 CH Yes | 0 | Yes | WCC-PCN-100GB | 0 | -4.5 | tbd | tbd |
| 80 CH Yes | 1 | Yes | N-CFP=1061700634 | 0 | -4.5 | tbd | tbd |
| 40 CH No | 0 | No |  | 0 | -2 | 13 | -10 |
| 40 CH No | 1 | Yes |  | 0 | -2 | 13 | -10 |

FIG. 8

SYSTEMS AND METHODS FOR AUTOMATED CONFIGURATION OF COMMUNICATIONS EQUIPMENT

CROSS-REFERENCE TO RELATED APPLICATIONS

This application claims the benefit of U.S. Provisional Application No. 63/284,079 filed Nov. 30, 2021, entitled "Systems and Methods for Automated Configuration of Communications Equipment," which is incorporated herein by reference in its entirety.

BACKGROUND

Generally, when installing telecommunications equipment, a field technician is called to a site where a network device is physically located (e.g., is installed or to be installed) in order to commission the network device for use in a telecommunications network. For example, the network device may be received from a vendor in an initial or default configuration, and when physically installing the network device at a customer site, the field technician may need to reconfigure the network device from the default configuration to a suitable configuration according to various vendor dependent platform requirements and customer requirements.

For example, the field technician may physically connect a field device to the network device in order to login to the network device from the field device, and may configure the network device to communicate with one or more other network devices in the telecommunications network by manually typing and executing various different configuration commands, for example, such as transactional language 1 (TL1) commands or command-line interface (CLI) commands, one at a time from a suitable command prompt, command line, or the like on the field device according to the various different vendor dependent platform requirements and/or customer requirements. Such manual configurations, however, may be time consuming and may be prone to human errors.

The above information disclosed in this Background section is for enhancement of understanding of the background of the present disclosure, and therefore, it may contain information that does not constitute prior art.

SUMMARY

One or more embodiments of the present disclosure are directed to an automated configuration tool for commissioning telecommunications equipment.

According to one or more embodiments of the present disclosure, a field device includes: a processor; and memory including instructions that, when executed by the processor, cause the processor to: login to a local node device physically connected to the field device; enable a common command protocol on the local node device; solicit information to configure the local node device; generate a command set in the enabled common command protocol according to the solicited information; and execute the command set to automatically commission the local node device to communicate with one or more other node devices commissioned in a first network.

In an embodiment, the instructions may further cause the processor to solicit a platform type of the local node device, and the information that is solicited may be based on the platform type.

In an embodiment, the instructions may further cause the processor to select a command template according to the platform type, and the command set may be generated based on the selected command template.

In an embodiment, the instructions may further cause the processor to: receive an indication to initiate a remote test from the local node device; solicit local test information corresponding to the local node device, and remote test information corresponding to a remote node device from among the one or more other node devices commissioned in the first network; validate a login to each of the local node device and the remote node device; generate and execute a set of local verification commands on the local node device based on the solicited local test information; and generate and execute a set of remote verifications commands on the remote node device from the local node device based on the solicited remote test information.

In an embodiment, the instructions may further cause the processor to generate an execution report in response to executing the command set.

In an embodiment, the instructions may further cause the processor to: store an inventory corresponding to the execution report of the commissioned node device in a storage device of the field device; and reconcile the inventory with an external inventory system in response to the field device establishing a connection to the external inventory system.

In an embodiment, the first network may be a fiber optics network, and the local node device may be commissioned to communicate light with the one or more other node devices over fibers of the first network.

In an embodiment, the local node device may be a dense wavelength division multiplexing network device.

In an embodiment, the field device may be physically connected to the node device via a universal cable.

In an embodiment, the universal cable may be a CAT-5 cable.

In an embodiment, the solicited information may include network configuration information, and the instructions may further cause the one or more processors to: select a network configuration command template according to a platform type of the local node device; generate a network configuration command set according to the selected network configuration command template and the network configuration information; and execute the network configuration command set to configure a controller of the node device with the network configuration information.

In an embodiment, the solicited information may include card configuration information, and the instructions may further cause the one or more processors to: receive a selection of a card device to be configured in the local node device, the card device being physically installed in a shelf of the local node device; select a card configuration command template according to the selected card device; generate a card configuration command set according to the selected card configuration command template and the card configuration information; and execute the card configuration command set to augment a capacity the node device based on the installed card device.

In another embodiment, the present application discloses a method, executed by a field device, comprising: logging into a local node device physically connected to the field device; enabling a common command protocol on the local node device; soliciting information to configure the local node device; generating a command set in the enabled common command protocol according to the solicited information; and executing the command set to automatically commission the local node device to communicate with one or more other node devices commissioned in a first network.

In another embodiment, the present application discloses a field device, comprising: at least one processor; and memory, operatively connected to the at least one processor and storing instructions that, when executed by the at least one processor, cause the field device to: login to a local node device physically connected to the field device; enable a common command protocol on the local node device; solicit information to configure the local node device; determine a platform type of the local node device; generate, based on the platform type of the local node device, a command set in the enabled common command protocol according to the solicited information; execute the command set to automatically commission the local node device to communicate with one or more other node devices commissioned in a first network; receive an indication to initiate a remote test from the local node device; solicit local test information corresponding to the local node device, and remote test information corresponding to a remote node device from among the one or more other node devices commissioned in the first network; validate a login to each of the local node device and the remote node device; generate and execute a set of local verification commands on the local node device based on the solicited local test information; and generate and execute a set of remote verifications commands on the remote node device from the local node device based on the solicited remote test information.

Other example embodiments will be evident and explained with respect to the below-referenced figures and detailed description.

BRIEF DESCRIPTION OF THE DRAWINGS

The above and other aspects and features of the present disclosure will be more clearly understood from the following detailed description of the illustrative, non-limiting example embodiments with reference to the accompanying drawings.

FIG. 6 illustrates a page flow of a graphical user interface of a commissioning application according to the method of FIG. 5.

FIG. 8 illustrates a filter attenuation table according to one or more embodiments of the present disclosure.

DETAILED DESCRIPTION

Figure 1:
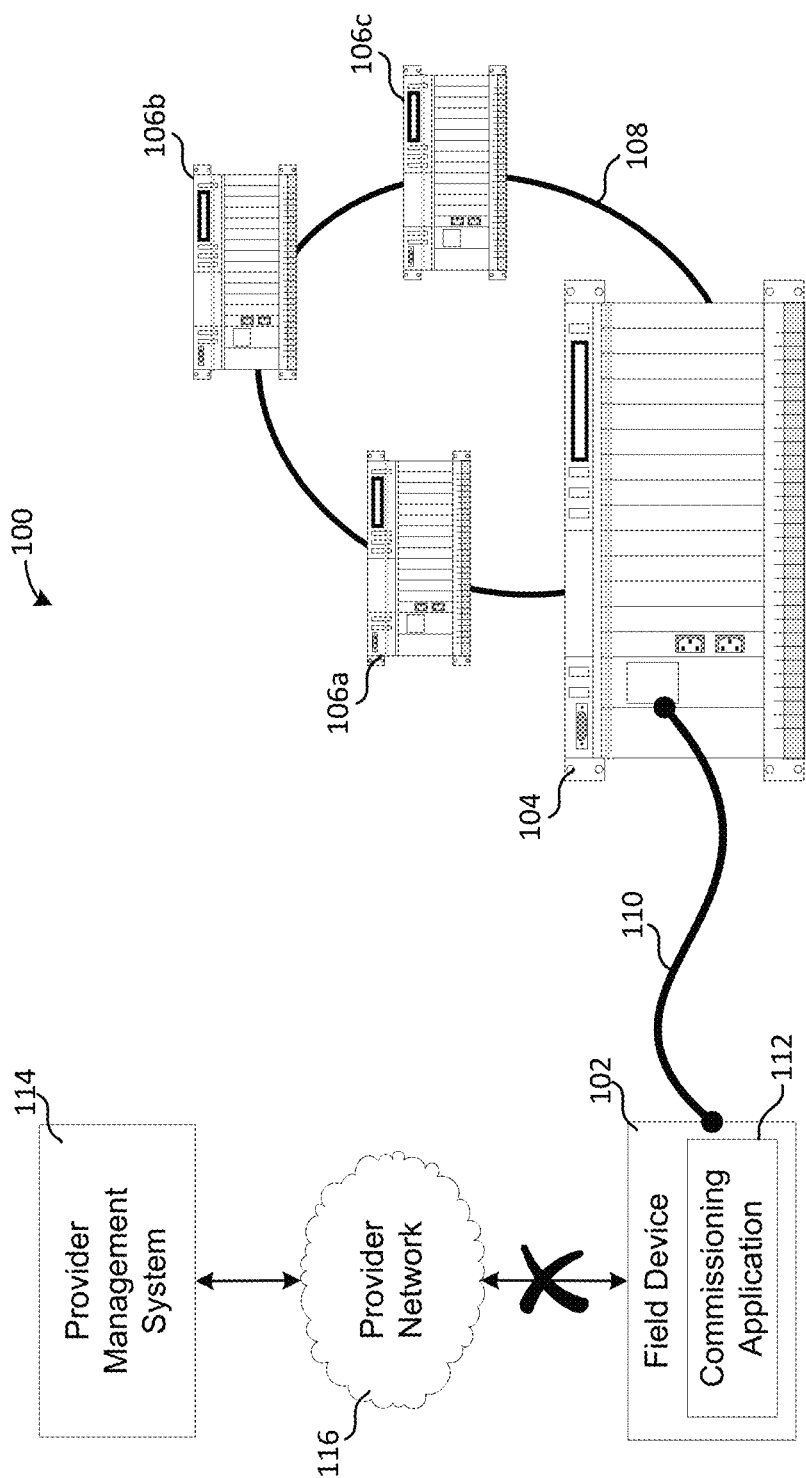
FIG. 1 illustrates a telecommunications equipment commissioning system according to one or more embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Typically, the command protocols and the configuration commands used to configure various different network devices may be based on vendor platform and/or customer requirements, and thus, different network devices may require different command protocols and/or different configuration commands. Thus, in order for a field technician to manually configure the different network devices by the different vendors, the field technician may need to be trained on each of the various different network devices that may be commissioned out in the field (e.g., at a customer site), for example, such as the various different cables that are used to physically connect to the different network devices, the different command protocols used by the different network devices, the various different configuration commands used to configure the different network devices, the various different devices (e.g., card devices, rectifiers, battery plants, or the like) that are allowed to be installed in the different network devices, and the like. Accordingly, a significant amount of time and effort may be expended to suitably train the field technician to understand the various different network devices that may be commissioned out in the field, and human errors may be caused when the configuration commands are manually entered to commission a network device.

According to one or more embodiments of the present disclosure, an automated configuration tool may be provided that enables a field technician to automatically configure a network device out in the field (e.g., at a customer site), for example, based on a platform type of the network device. For example, in some embodiments, the field technician may physical connect a field device (e.g., a laptop or other suitable computing device) to a node device being commissioned out in the field, and may automatically configure the node device using a commissioning application. The commissioning application may solicit the field technician to enter the platform type of the node device being commissioned, as well as desired configuration information for commissioning the node device according to the platform type, and may automatically generate and execute the configuration commands in a suitable command protocol according to the solicited configuration information. Accordingly, the commissioning application may enable the field technician to simply select a platform type of the node device being commissioned and provide the solicited configuration information to automatically commission the node device, rather than requiring the field technician to manually enter and execute each of the configuration commands.

In some embodiments, the field device may be physically connected to the node device using a standard or universal cable, and the commissioning application may commission the node device using the standard or universal cable, regardless of a preferred cable identified by a particular vendor for commissioning the node device. For example, in some embodiments, the commissioning application may enable a suitable command protocol to enable the node device to receive the configuration commands from the field device over the standard or universal cable, such that the number of different cables used to commission the different node devices may be reduced. Accordingly, in some embodiments, the commissioning application may use the same cable to physically connect to various different node devices from various different vendors, such that cable complexity may be reduced.

In some embodiments, the commissioning application may enable the field technician to perform remote tests between the node device being commissioned and one or more other network devices that have been commissioned as part of a larger network. For example, in some embodiments, the commissioning application may enable the field technician to login to a neighboring (e.g., adjacent) network device from the newly commissioned node device, and may solicit test configuration information for each of the commissioned node device and the neighboring network device. The commissioning application may generate and execute a set of test commands on each of the commissioned node device and the neighboring network device to validate a connection between the commissioned node device and the neighboring network device. In some embodiments, the commissioning application may remotely login to the neighboring network device from the commissioned node device to modify a configuration of the neighboring network device as needed or desired from the commissioned node device. Accordingly, truck rolls and the like may be reduced.

In some embodiments, the commissioning application may store a physical inventory (e.g., the actual hardware, equipment, or the like) and/or a logical inventory (e.g., how the hardware/equipment are connected) of the node device being commissioned, and may reconcile the physical inventory and/or the logical inventory with an external inventory management system when subsequently connected to the external inventory management system. For example, some customers (e.g., governmental agencies and the like) may not allow the field device to be connected to an external network while commissioning the node device. Thus, the field device may store the physical inventory and/or the logical inventory (e.g., based on a configuration result) of the commissioned node device, and when the field device 102 is subsequently connected to an external network, the field device may provide the physical inventory and/or the logical inventory to the external inventory management system to update or consolidate with the inventory of (e.g., what is shown or maintained by) the external inventory management system.

However, the aspects and features of the present disclosure are not limited to those described above, and the above and other aspects and features of the present disclosure will be described in more detail hereinafter with reference to the figures.

Figure 2:
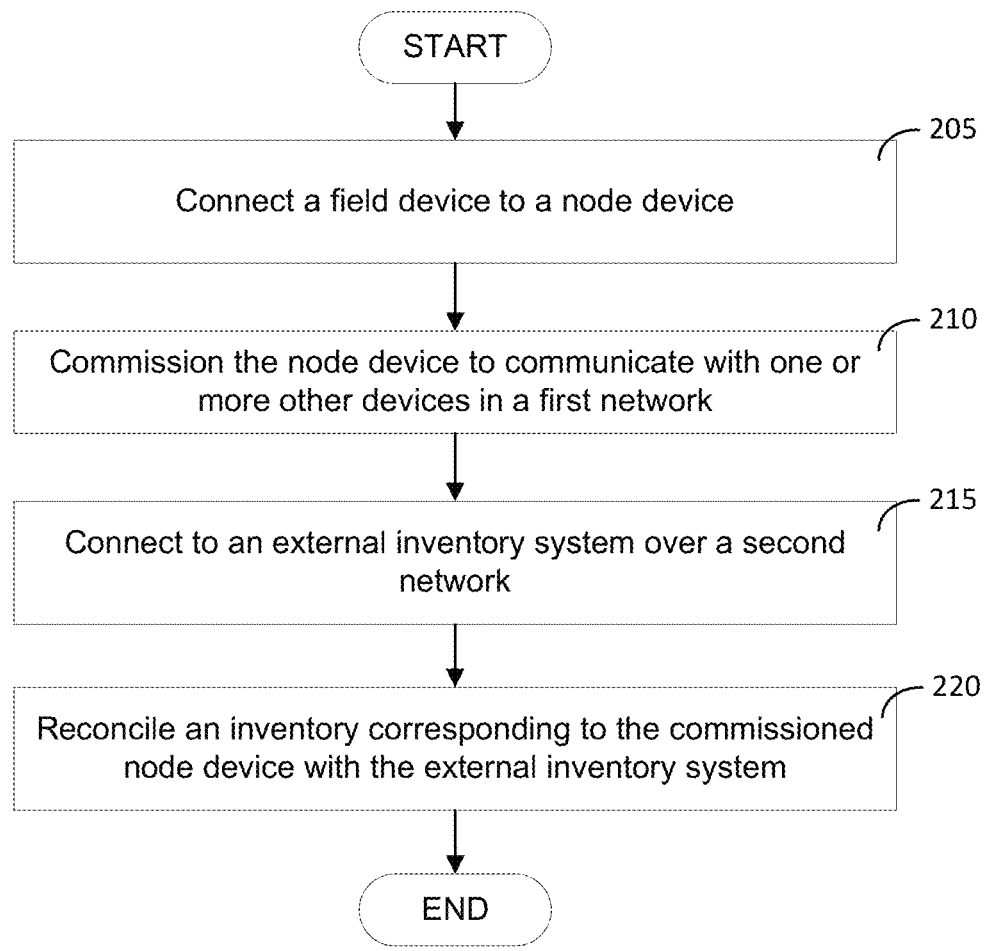
FIG. 2 illustrates a flow diagram of a method of commissioning a node device of a telecommunications system according to one or more embodiments of the present disclosure.

FIG. 1 illustrates a telecommunications equipment commissioning system according to one or more embodiments of the present disclosure. FIG. 2 illustrates a flow diagram of a method of commissioning a node device of a telecommunications system according to one or more embodiments of the present disclosure. However, the present disclosure is not limited to the sequence or number of operations of the method 200 shown in FIG. 2, and can be altered into any desired sequence or number of operations as recognized by a person having ordinary skill in the art. For example, in some embodiments, the order may vary, or the method 200 may include fewer or additional operations. Further, the operations shown in the method 200 may be performed sequentially, or at least some of the operations thereof may be performed concurrently (e.g., simultaneously or substantially simultaneously).

Referring to FIG. 1, a telecommunications equipment commissioning system 100 may include a field device 102 and a node device 104. The field device 102 may be used by a field technician to automatically commission the node device 104 out in the field (e.g., at a customer's site), such that the node device 104 may be configured to communicate with one or more other network devices 106a, 106b, and 106c located at various different geographical locations that have been commissioned as part of a larger network (e.g., a telecommunications network or a first network) 108. For example, the field device 102 may include any suitable computing device, for example, such as a laptop computer, a personal computer (PC), a tablet computer, a smart phone, and/or the like.

In some embodiments, the first network 108 may be a fiber optics network, and each of the node device 104 and the one or more other network devices 106a, 106b, and 106c may be commissioned as transport nodes of the fiber optics network 108, for example, such as a dense wavelength division multiplexing (DWDM) network device. In this case, the node device 104 and the one or more other network devices 106a, 106b, and 106c may communicate with one another by passing (e.g., transmitting) light (e.g., a laser light) to one another through fiber channels of the fiber optics network 108. However, the present disclosure is not limited thereto, and the node device 104 may be any suitable physical device that may be commissioned out in the field according to a type of the network 108, for example, such as a coarse wavelength division multiplexing (CWDM) device or other suitable wavelength division multiplexing (WDM) device, an internet protocol (IP) network device, or the like. For convenience, the node device 104 may be described in the context of a DWDM device hereinafter, but the present disclosure is not limited thereto.

Accordingly, referring to FIG. 2, the field device 102 may be connected to the node device 104 at block 205, and may be used by the field technician to automatically commission the node device 104 to communicate with the one or more other network devices 106a, 106b, and 106c provisioned in the first network (e.g., the fiber optics network) 108 at block 210. For example, in some embodiments, the field technician may physically connect the field device 102 to the node device 104 via a cable 110. In some embodiments, the cable 110 may be a universal or standard cable, such that the cable 110 may be used to commission various different node devices from various different vendors, regardless of the preferred cable identified by a particular vendor that may generally be used when commissioning the node device 104. For example, in some embodiments, the cable 110 may be a CAT-5 cable that may be used to commission various node devices from various different vendors. Thus, rather than requiring the field technician to be knowledgeable in the various different types of cables used by the different vendors to connect to the node device 104, the cable 110 may be a universal or standard cable that may be used to commission various different node devices from various different vendors regardless of the cables specified by the different vendors. However, the present disclosure is not limited thereto, and in other embodiments, the cable 110 may be a vendor specified or vendor specific cable that may be used to physically connect the field device 102 to the node device 104 when automatically commissioning the node device 104 out in the field.

In some embodiments, as shown in FIG. 1, the field device 102 may include a commissioning application 112 to automatically commission the node device 104 to communicate with the one or more other network devices 106a, 106b, and 106c in the first network (e.g., the fiber optics network) 108. For example, in some embodiments, the commissioning application 112 may facilitate the field technician to login to the node device 104 from the field device 102, and may enable a common protocol on the node device 104 to enable the node device 104 to receive configuration commands from the commissioning application 112 over the cable 110. The commissioning application 112 may solicit various configuration information from the field technician to automatically configure the node device 104 based on the solicited configuration information. For example, in some embodiments, the commissioning application 112 may present a plurality of data fields to enable the field technician to simply enter the solicited configuration information in the plurality of data fields, rather than having to manually enter and execute a plurality of commands from a command prompt, a command line, or the like. In some embodiments, the commissioning application 112 may automatically generate and execute a set of configuration commands in response to the solicited configuration information in order to suitably commission the node device 104 according to the solicited configuration information. The commissioning application 112 will be described in more detail below with reference to FIGS. 4-13.

Still referring to FIGS. 1 and 2, in some embodiments, the field device 102 may be communicably connected to a provider management system 114 via a provider network 116. For example, the provider network 116 may be structured to enable the exchange of data, values, instructions, messages, and/or the like among the field device 102 and the provider management system 114. In various embodiments, the provider network 116 may include any suitable wired or wireless network (e.g., a Local Area Network (LAN), a Wide Area Network (WAN), cellular communications network, and/or the like). For example, the provider network 116 may include Frequency Division Multiple Access (FDMA), Time Division Multiple Access (TDMA), Code Division Multiple Access (CDMA) (e.g., Evolution-Data Optimized (EVDO)), Universal Mobile Telecommunications Systems (UMTS) (e.g., Time Division Synchronous CDMA (TD-SCDMA or TDS)), Wideband Code Division Multiple Access (WCDMA), Long Term Evolution (LTE), evolved Multimedia Broadcast Multicast Services (eM-BMS), High-Speed Downlink Packet Access (HSDPA), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, Bluetooth, Wi-Fi, any suitable wired network, combinations thereof, and/or the like.

The provider management system 114 may include an inventory management system (e.g., a physical inventory management system and/or a logical inventory management system) to maintain an inventory (e.g., a network inventory) corresponding to a physical inventory and/or a logical inventory of the commissioned node device 104. As used herein, the physical inventory refers to an actual equipment configuration of the commissioned node device, for example, such as a location of the node device 104, an IP address configured on the node device, the card devices installed therein, and the like, whereas the logical inventory is a consumption of the physical inventory, for example, such as whether a port of the commissioned node device 104 is being used, whether there are internal cross-connects within the commissioned node device 104, and the like. In some embodiments, the provider management system 114 may include or may be communicably connected to a service management system that may configure and/or maintain a service layer of the node devices that have been commissioned at various customer sites, such that various suitable end-to-end services (e.g., end-to-end circuit level designs) may be configured (e.g., turned up, turned down, and/or modified) on the commissioned node devices.

In some embodiments, as shown in FIG. 1, the field device 102 may not have connection to the provider network 116 when commissioning the node device 104, as described above. For example, the field device 102 may not be allowed to be connected to an external network (e.g., such as the provider network 116) while commissioning the node device 104. In this case, the field device 102 may store the physical inventory and/or the logical inventory (e.g., corresponding to a configuration result) of the node device 104 in a local storage device (e.g., 314 in FIG. 3), and when the field device 102 is subsequently connected to the provider network 116, the field device 102 may provide the physical inventory and/or the logical inventory to the provider management system 114 to update or consolidate with its inventory, which may be a central inventory system. Accordingly, manual entry of the physical inventory and/or the logical inventory may be reduced, and thus, human errors may be reduced. Moreover, in some cases, the inventory (e.g., the central inventory system) managed by the provider management system 114 may be out of sync or incorrect on both what is physically installed in a node device and how it is connected, because the provider management system 114 may not have been properly updated after changes to the node device that have been previously made. Accordingly, by allowing the field technician to physically verify what equipment is there and also to run a trace while at the customer site to determine how the equipment (e.g., all the ports and the like) are connected, more accurate inventory data may be captured and reconciled with the inventory (e.g., the central inventory system) of the provider management system 114.

Accordingly, as shown in FIG. 2, in some embodiments, the field device 102 may store the configuration result of the commissioned node device 104, and may subsequently connect to an external inventory system (e.g., the provider management system 114) over a second network (e.g., the provider network 116) at block 215. The second network 116 may be different from the first network 108 in which the node device 104 is commissioned, but the present disclosure is not limited thereto. Once the field device 102 establishes a connection to the second network 116, the commissioning application 112 may automatically upload an inventory (e.g. the physical inventory and/or the logical inventory corresponding to the configuration result) to the provider management system 114 to reconcile the inventory (e.g., the physical inventory and/or the logical inventory) corresponding to the commissioned node device 104 with the external inventory system at block 220, and the method 200 may end.

Figure 3:
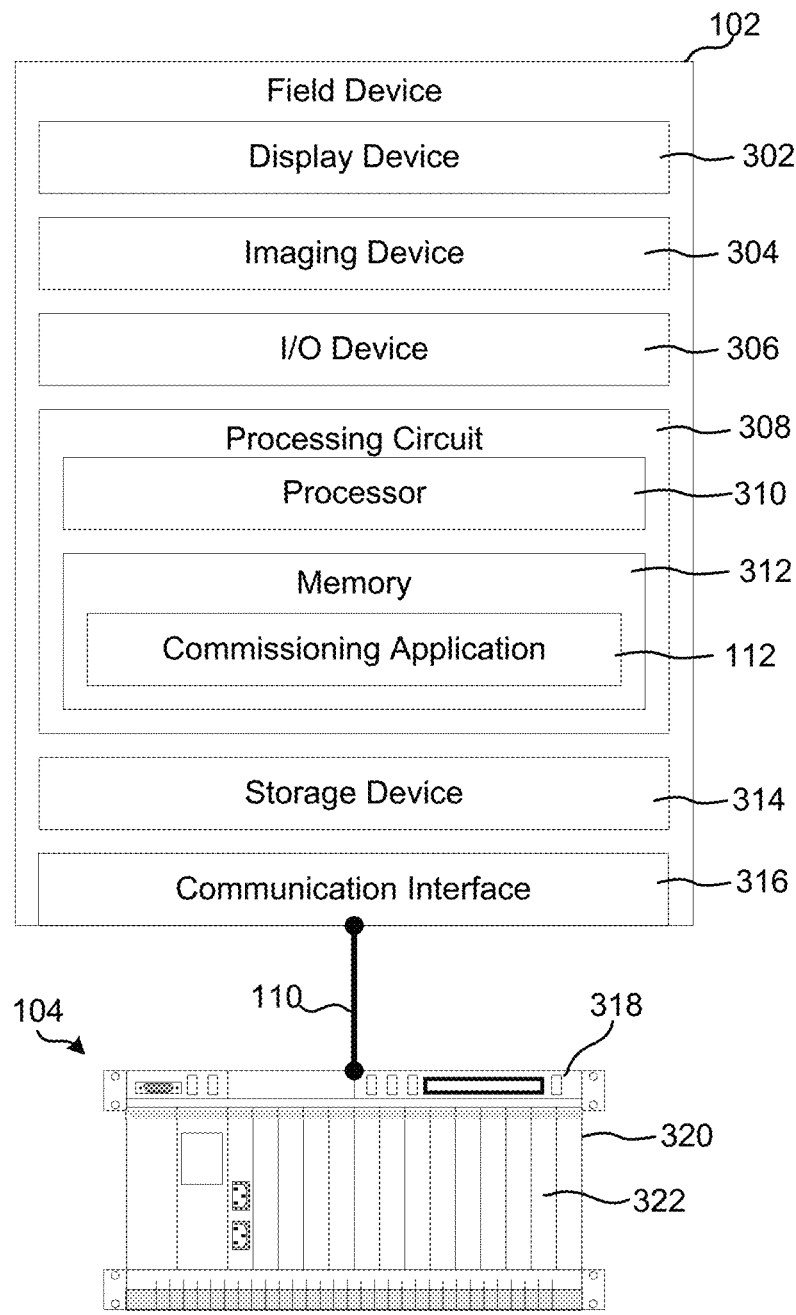
FIG. 3 illustrates a block diagram of a field device connected to a node device according to one or more embodiments of the present disclosure.
Figure 4:
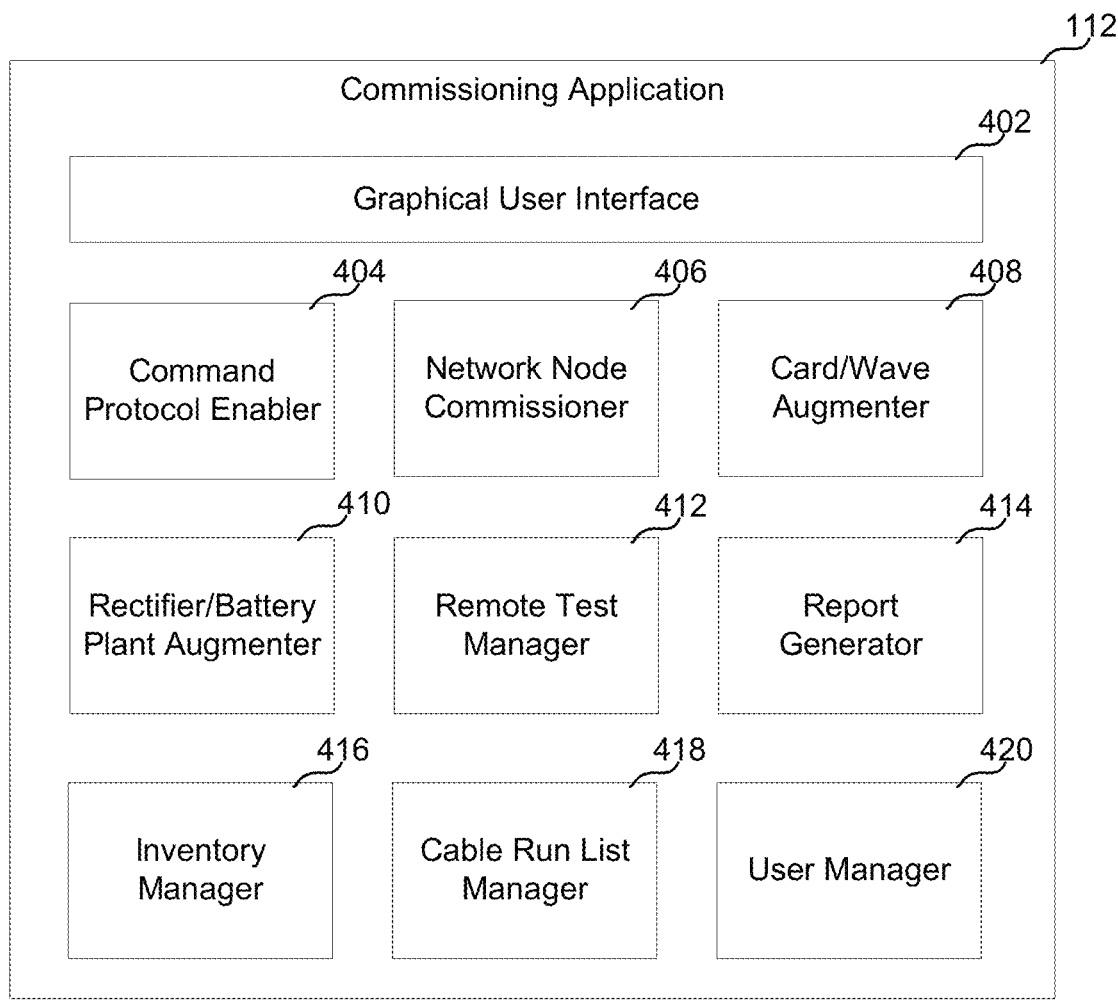
FIG. 4 illustrates a block diagram of a commissioning application according to one or more embodiments of the present disclosure.

FIG. 3 illustrates a block diagram of a field device connected to a node device according to one or more embodiments of the present disclosure. FIG. 4 illustrates a block diagram of a commissioning application according to one or more embodiments of the present disclosure.

Referring to FIG. 3, the field device 102 may be physically connected to the node device 104 via the cable 110 in order to commission the node device 104 to communicate with the one or more other network devices 106a, 106b, and 106c, of the first network (e.g., the larger network) 108. For example, in some embodiments, the field device 102 may include a display device 302, an imaging device 304, an input/output (I/O) device 306, a processing circuit 308, a storage device 314, and a communication interface 316. The field device 102 may further include a plurality of ports for communicating with a video card, a sound card, a memory card, a universal serial bus (USB) device, other suitable electronic devices, and/or the like.

The display device 302 may be an organic light-emitting display device, a inorganic light-emitting display device, a liquid crystal display (LCD) device, and/or the like. The imaging device 304 may include an image capture device, for example, such as a camera, a scanner, an imaging sensor, and/or the like. The I/O device 306 may include an input device, for example, such as a keyboard, a keypad, a mouse, a touch screen, and/or the like, and an output device, for example, such as a printer, a speaker, and/or the like. The storage device 314 may be a solid state drive (SSD) device, a hard disk drive (HDD) device, an optical disk drive device, and/or the like.

The communication interface 316 may be or include wired and/or wireless communications interfaces (e.g., ports, jacks, antennas, transmitters, receivers, transceivers, wire terminals, and/or the like) for conducting data communications with the provider management system 114, the node device 104, and/or other external systems or devices. In various embodiments, communications via the communication interface 316 may be direct (e.g., local wired or wireless communications) or via the provider network 116 (e.g., a WAN, the Internet, a cellular network, and/or the like). For example, the communications interface 316 may include an Ethernet card and port or other suitable wired communications interface for sending and receiving data with the node device 104 via the cable 110. In another example, the communication interface 316 may include a Wi-Fi transceiver for communicating with the provider management system 114 via the provider network 116 or other suitable wired or wireless communications network. In another example, the communication interface 316 may include cellular or mobile phone communications transceivers.

The processing circuit 308 may include one or more processors 310 and memory (e.g., one or more memory or memory devices) 312. The processing circuit 308 may be communicably connected to the communication interface 316, such that the processing circuit 308 and the various components thereof may send and receive data via the communication interface 316. The processor 310 may be implemented with one or more general-purpose processors, an ASIC, one or more FPGAs, a DSP, a group of processing components, or other suitable electronic processing components.

The memory 312 may be implemented with RAM, NVRAM, ROM, Flash Memory, hard disk storage, and/or other suitable electronic storage devices. The memory 312 stores data and/or computer code for facilitating at least some of the various processes described herein. The memory 312 includes tangible, non-transitory, volatile or non-volatile memory. The memory 312 may include database components, object code components, script components, and/or any other type of information structure for supporting the various activities and information structures described in the present application. According to an embodiment, the memory 312 is communicably connected to the processor 310 via the processing circuit 308, and includes computer code for executing (e.g., by processing circuit 308 and/or the processor 310) one or more processes described herein. For example, the memory 312 stores instructions or programming logic that, when executed by the processor 310, controls the operations of the field device 102.

As shown in FIG. 3, the memory 312 may include the commissioning application 112. The commissioning application 112 may be downloaded or otherwise installed in the memory 312, and be used by the field technician to automatically commission the node device 218 at a customer site. For example, in some embodiments, the node device 104 may include a controller 318, a housing 320, and a plurality of slots electrically connected to the controller 318. The plurality of slots may receive one or more card devices 322 to augment a capacity and/or a functionality of the node device 104. For example, in the context of a DWDM device, the one or more card devices 322 may be installed in one or more of the slots of the node device 104 to augment various wavelengths of capacity of the node device 104.

Accordingly, in some embodiments, to commission the node device 104 as a transport node in the first network 108, the field technician may use the commissioning application 112 to configure the controller 318 of the node device 104 with network configuration information corresponding to the first network 108, augment a capacity and/or a functionality of the node device 104 according to the one or more card devices 322 installed therein, and test a connection between the commissioned node device 104 and the one or more other network devices 106a, 106b, and 106c of the first network 108.

For example, referring to FIG. 4, in some embodiments, the commissioning application 112 may include a graphical user interface (GUI) 402 that may be manipulated by the field technician to commission the node device 104. The GUI 402 may be displayed on the display device 302 to solicit a platform type of the node device being commissioned, as well as various configuration information to suitably commission the node device 104. For example, in some embodiments, the GUI 402 may present a page flow (e.g., see FIGS. 6 and 12) to the field technician including a plurality of data fields to solicit desired configuration information from the field technician. Accordingly, in some embodiments, the field technician may simply enter the solicited configuration information in the plurality of data fields presented by the GUI 402, rather than having to manually enter and execute a plurality of commands from a command prompt, a command line, or the like.

In response to the platform type and the configuration information solicited from the field technician, the commissioning application 112 may select a suitable command template (e.g., according to a platform type of the node device 104 being commissioned), and may automatically generate and execute a set of configuration commands according to the selected command template and the solicited configuration information to commission the node device 104. For example, in some embodiments, the selection of the command template may be rule based according to a platform type of the node device 104. For example, a script may be automatically executed based on the platform type of the node device 104, and the script may generate, compile, and execute the configuration commands according to the configuration information solicited from the field technician. For example, in some embodiments, the commissioning application 112 may include a command protocol enabler 404, a network node commissioner 406, a card/wave augmenter 408, a rectifier/battery plant augmenter 408, a remote test manager 412, a report generator 414, a cable run list manager 416, an inventory manager 418, and a user manager 420.

The command protocol enabler 404 may enable a common command protocol on the node device 104 from the field device 102. For example, in some cases, when a node device to be commissioned is initially received from a vendor, the vendor may disable the common command protocol on the node device based on vendor requirements and/or customer requirements. However, the common command protocol may be a baseline protocol that is understood by various different node devices from various different vendors, and thus, may be used by the commissioning application 112 to commission the various different node devices from the various different vendors. Accordingly, in some embodiments, the command protocol enabler 404 may enable the commissioning application 112 to login to the node device 104 and enable the common command protocol on the node device 104, such that the commissioning application 112 may communicate with the node device 104 over the cable 110 to generate and execute the configuration commands in a suitable command protocol that the node device 104 may understand. For example, in some embodiments, the common command protocol may include a TL1 command protocol or a CLI command protocol, but the present disclosure is not limited thereto.

The network node commissioner 406 may configure the node device 104 as a new network node in the first network 108 according to one or more embodiments of the present disclosure. For example, the network node commissioner 406 may commission the node device 104 to allow minimum operational functionality including device name, login/password, IP address, and network connectivity, for example, to allow access to the node device by remote technicians. The network node commissioner 406 may identify a network configuration command template based on a platform type of the node device 104, and may generate, compile, and execute a network configuration command set according to solicited network configuration information to configure the node device 104 from a default or initial network configuration to a suitable network node configuration for communicating in the first network 108. For example, in some embodiments, the network node commissioner 406 may reconfigure the controller 318 of the node device 104 from its default or initial network configuration based on the solicited network configuration information, for example, such as the platform type for the node device 104, a name of the node device 104, a location of the node device 104, an internet protocol (IP) address of the node device 104, and/or the like. In some embodiments, the node commissioner 404 may further configure some standard card devices that come pre-installed and/or pre-configured in the node device 104, for example, such as some common card devices (e.g., chassis, power supply, system controller, network controller, fans, and/or the like) that provide various common functionalities for the node device 104. A method of commissioning the node device as a new network node in the first network 108 will be described in more detail below with reference to FIGS. 5 and 6.

The card/wave augmenter 408 may augment a capacity (e.g., wavelength of capacity) of the node device 104 by configuring one or more card devices that are installed in the node device 104. For example, the card/wave augmenter 408 may configure a shelf of the node device 104 for the card device to be installed therein, and may configure the card devices that have been installed in the shelf of the node device 104. The card/wave augmenter 408 may generate, compile, and execute a card configuration command set according to solicited card configuration information to add, augment, or otherwise configure a capacity of the node device 104. For example, in the context of a DWDM device, a wavelength of capacity may be added to the node device 104 by installing a suitable wave card device 322 in a slot of the node device 104, configuring the controller 318 of the node device 104 to identify (e.g., to recognize and/or communicate with) the installed wave card device 322, and configuring the installed wave device for a desired frequency. Accordingly, in some embodiments, the card/wave augmenter 406 may reconfigure the node device 104 according to the wave card device 322 installed therein based on the solicited card configuration information, for example, such as a shelf location, a shelf type, and a slot number where the wave card device 322 is installed, as well as filter attenuation information (e.g., for a passive physical device to lower signal strength), a card type of the wave card device 322, a transceiver (e.g., XFP) type (which may be a 10 gigabit small form-factor pluggable for providing light/laser), a service type (e.g., a customer requested signal), and/or the like. A method of augmenting a capacity of the node device 104 will be described in more detail below with reference to FIGS. 7-11.

The rectifier/battery plant augmenter 410 may generate, compile, and execute a set of power management configuration commands according to solicited power management configuration information in order to configure a rectifier and/or a battery plant of the node device 104. The rectifier and/or battery plant may include, for example, an AC to DC power conversion unit with battery backup to provide continuous DC power in case of power failure, and in some embodiments, may normalize the input power to provide a clean power source. For example, in some embodiments, the rectifier/battery plant augmenter 410 may reconfigure the controller 318 of the node device 104 to identify and/or communicate with a rectifier and/or a battery plant installed in the node device based on the solicited power management configuration information. The rectifier/battery plant augmenter 410 may configure the rectifier and/or a battery plant of the node device 104 based on the solicited power management configuration information in the same or substantially the same (or similar) way as that of the card/wave augmenter 408 configuring the card wave devices based on the solicited card configuration information, and thus, redundant description thereof may not be repeated.

The remote test manager 412 may enable the field technician to perform a remote test between the newly commissioned node device 104 (e.g., a local node device) and the one or more other network devices 106a, 106b, and 106c (e.g., a remote node device) that have already been commissioned in the first network 108. For example, in some embodiments, the remote test manager 412 may enable the field technician to login to a remote node device (e.g., a neighboring or adjacent node device) from among the one or more other network devices 106a, 106b, and 106c commissioned in the first network 108 from the local node device 104 (e.g., the newly commissioned node device), for example, using an IP address configured on the remote node device. The remote test manager 412 may enable the field technician to perform light level tests between the local node device 106 and the remote node device, for example, by automatically generating and executing a set of test configuration commands responsive to test configuration information for each of the local node device 104 and the remote node device solicited from the field technician via the GUI 402. In some embodiments, the remote test manager 412 may login to the remote node device from the local node device 104, and may enable the field technician to reconfigure the remote node device from the local node device 104 as needed or desired. Accordingly, a separate remote tester may not be needed in order to perform the remote test, and/or truck rolls between the site of the newly commissioned device and the site of the neighboring node device may be reduced. A method of conducting a remote test from the local node device 104 will be described in more detail below with reference to FIGS. 12 and 13.

The report generator 414 may generate a configuration result of the newly commissioned node device 104. For example, the report generator 414 may generate an execution report corresponding to a successful or unsuccessful execution of each of the configuration commands used to configure the node device 104. Accordingly, in some embodiments, the execution report may be used to generate a physical inventory of the newly commissioned node device 104, troubleshoot errors when configuring the node device 104, and/or the like.

The inventory manager 416 may store (e.g., in the storage device 314) an inventory (e.g., a physical inventory and/or a logical inventory) of the newly commissioned node device 104, and may reconcile the inventory with an external inventory system (e.g., the central inventory system of the provider management system 114). For example, in some embodiments, the GUI 402 may provide a "retrieve all" function that causes the inventory manager 416 to populate the configurations of the newly commissioned node device 104, the card devices 322 installed in the newly commissioned node device 104, and/or the like, and may upload the physical inventory to the provider management system 114 to reconcile with the central inventory system when the field device 102 establishes a connection with the provider network 116. In some embodiments, the inventory manager 416 may further provide a "retrieve all cross-connects" function and the like, such that the inventory manager 416 may populate the internal cross-connects of the newly commissioned node device 104 to generate the logical inventory corresponding to the newly commissioned node device 104. In some embodiments, if the physical inventory and/or the logical inventory is out of sync with the central inventory system, for example, in a case where a disconnect (e.g., a path between network elements that have been disconnected) or a cross-connect was partially processed, the inventory manager 416 may turn down ports of the node device 104 as needed or desired, for example, based on rules and/or user commands.

The cable run-list manager 418 may facilitate the field technician to physically interconnect various network elements with each other using various cables or wires. For example, the field technician may be required to connect port A on a first node device to port B on a second node device using a specific cable or wire, and such information may be generally contained in a cable run-list. However, typically, a cable run-list may be more complex than needed, and labels appended to the cables may be difficult to identify.

According to one or more embodiments of the present disclosure, a code (e.g., a Quick Response (QR) code) may be appended to the various cables or wires, and the cable run-list manager 418 may use the imaging device 304 to read the code such that a simplified cable run-list may be presented to the field technician when the code is read using the field device 102. Accordingly, the field technician may be simply provided information from among the cable run-list that is needed to connect the cable or wire between the node devices by scanning the code appended to the cable or wire, and such information may be retrieved from the storage device 314.

The user manager 420 may manage user authentication and authorization rights for the commissioning application. In some embodiments, the user manager 420 may enable administrators or super users to modify the various configuration templates used to automatically generate the various configuration commands, for example, based on new or modified platform requirements, such as when a new vendor is added or when vendor requirements or customer requirements are changed. Accordingly, in some embodiments, the commissioning application 112 may be easily modified as needed or desired, for example, to support more various different platform types of the node device 104 being commissioned.

Hereinafter, a method of commissioning a node device 104 using the commissioning application 112 will be described in more detail with reference to FIGS. 5-13. For example, the method described with reference to FIGS. 5-13 assumes an initial install of the node device 104, such that the node device 104 may be initially commissioned out in the field (e.g., at a customer site). In this case, the commissioning application 112 may automatically configure the node device 104 (e.g., the controller 318 thereof) with network configuration information solicited from the field technician according to the method 500 shown in FIG. 5, a capacity of the node device may be automatically augmented based on shelf configuration information and card configuration information solicited from the field technician according to the methods 700 and 1000 of FIGS. 7 and 10, and a remote test between the newly commissioned node device (e.g., a local node device) 104 and one or more other network devices (e.g., a remote node device) 106a, 106b, and 106c of the first network 108 may be conducted based on test configuration information solicited from the field technician according to the method 1200 shown in FIG. 12. However, the present disclosure is not limited thereto, and any of the methods 500, 700, 1000, and 1200 may be modified or omitted, for example, according to a work order for commissioning the node device 104. For example, if one or more new card devices are being installed in an already commissioned node device, then the method 500 may be omitted.

Figure 5:
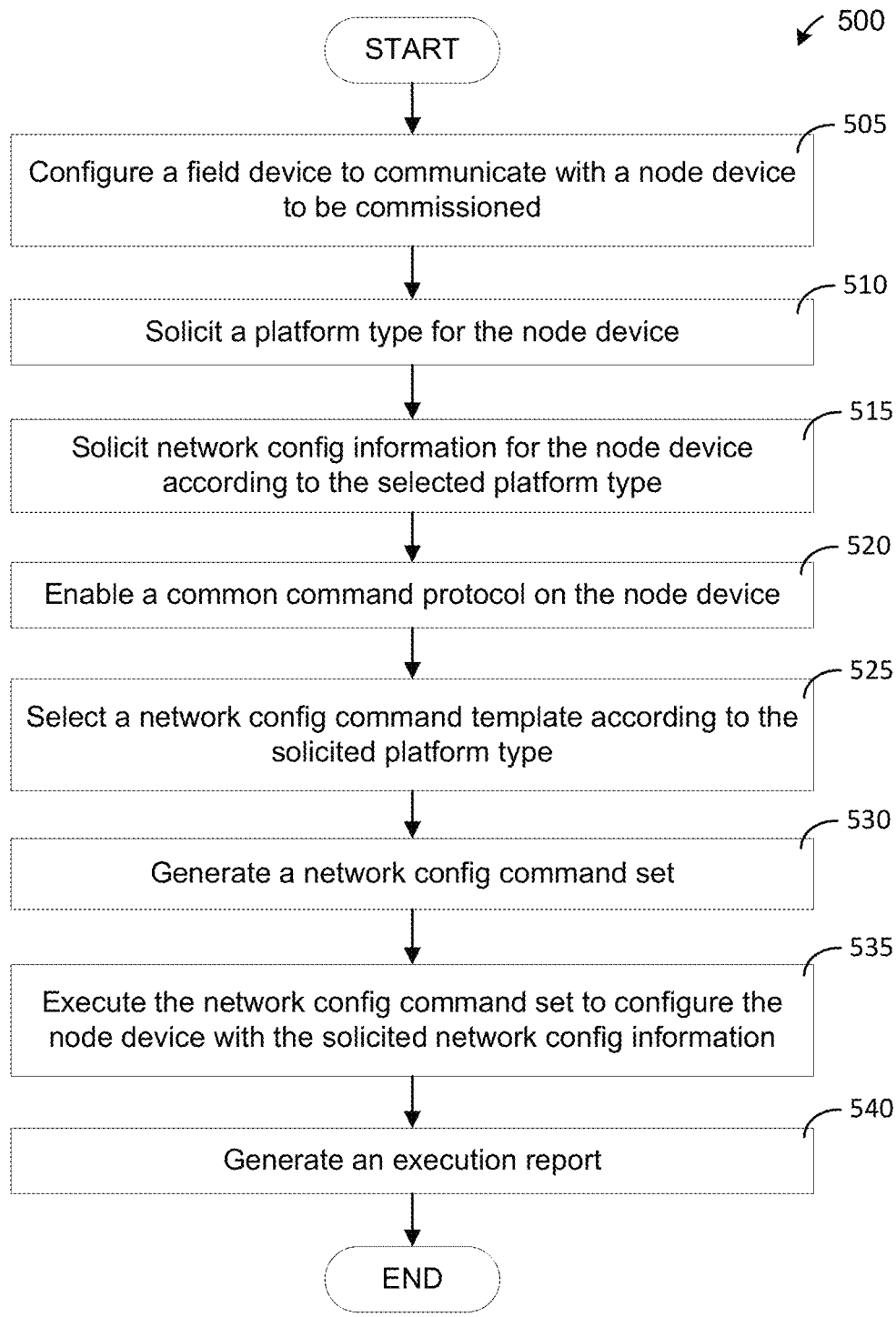
FIG. 5 illustrates a flow diagram of a method of configuring a node device as a new network node in a first network according to one or more embodiments of the present disclosure.

FIG. 5 illustrates a flow diagram of a method of configuring a node device as a new network node in a first network according to one or more embodiments of the present disclosure. FIG. 6 illustrates a page flow of a graphical user interface of a commissioning application according to the method of FIG. 5. However, the present disclosure is not limited to the sequence or number of operations of the method 500 shown in FIG. 5, and can be altered into any desired sequence or number of operations as recognized by a person having ordinary skill in the art. For example, in some embodiments, the order may vary, or the method 500 may include fewer or additional operations. Further, the operations shown in the method 500 may be performed sequentially, or at least some of the operations thereof may be performed concurrently (e.g., simultaneously or substantially simultaneously).

Referring to FIG. 5, the method 500 may be performed, for example, by the commissioning application 112 to configure the node device 104 with the network configuration information in order to be configured as a transport node of the first network 108. For example, the method 500 may start, and a field device 102 may be configured to communicate with a node device 104 to be commissioned at block 505. For example, as discussed above, the field technician may have physically connected the field device 102 to the node device 104 using the cable 110, and may initiate the commissioning application 112 from the field device 102 to communicate with the node device 104 via the cable 110. For example, in some embodiments, the cable 110 may be connected to an Optical Supervisory Channel Module Pluggable (OSCMP) card device (which may be an in-band 155 Mbit communication channel for node management (e.g., communication over system)) that is slotted in the node device 104, and the GUI 402 may present a page flow to the field technician to solicit connection information to configure the field device 102 to communicate with the node device 104 over the cable 110. In some embodiments, the solicited connection information may include, for example, a connection port (e.g., an ethernet port) of the field device 102 that is used to connect the cable 110, and a platform specific IP address, subnet mask, and/or gateway associated with the node device 104 to set a static IP on the field device 102 that may be used to communicate with the node device 104 over the cable 110.

A platform type of the node device may be solicited at block 510. For example, in some embodiments, the GUI 402 may present a page flow to the field technician to solicit a platform type of the node device 104 being commissioned. In some embodiments, the page flow may include a drop-down menu including a plurality of platform types that the field technician may select from in order to provide the platform type of the node device 104 being commissioned. In this case, human errors may be further reduced, for example, by prevented errors that may be caused when the field technician incorrectly manually types the platform type in the GUI 402, but the present disclosure is not limited thereto. For example, in other embodiments, the GUI 402 may present a list of platform types (e.g., as links or as buttons) that the field technician may select from, and/or a data field to enable the field technician to manually enter the platform type of the node device 104 being commissioned.

Network configuration information for the node device 104 may be solicited according to the selected platform type at block 515. For example, in some embodiments, as shown in FIG. 6, the GUI 402 may present a network node configuration page flow 600 to the field technician to solicit the network configuration information for the particular node device 104 being commissioned. The network configuration information may include configuration information for configuring the node device 104 as a new transport node in the first network 108, and thus, may include at least a node IP address assigned to the node device 104 in the first network 108. In some embodiments, the network configuration information that is solicited from the network node configuration page flow 600 may be used to automatically configure the node device 104, and thus, different information may be solicited according to the selected platform type. For example, according to the selected platform type in the non-limiting example shown in FIG. 6, the solicited network configuration information may include login information (e.g., a user name 602 and password 604) to enable the field device 102 to login to the node device 104, a target identifier (TID) 606 (which may be a unique identifier of the equipment), a system identifier (SID) 608 (which may be a unique identifier to differentiate equipment), a contact number 610, a location/room/rack 612, the node IP address 614, a subnet mask 616, a default gateway 618, a slot number of the node device 104 where the OSCMP card device is seated, and/or the like. However, the present disclosure is not limited thereto.

The network configuration information solicited from the network node configuration page flow 600 may be used to automatically generate and execute a set of network node configuration commands to configure the node device 104 as a transport node in the first network 108. As shown in FIG. 6, the network node configuration page flow 600 may present a plurality of data fields in which the field technician may simply enter the solicited information, rather than having to manually type and execute each of the network node configuration commands from a command prompt, a command line, or the like. Accordingly, training time may be decreased, commissioning time may be decreased, and human errors may be reduced.

A common command protocol may be enabled on the node device 104 at block 520. For example, as described above, in some embodiments, the commissioning application 112 (e.g., the command protocol enabler 404) may enable the common command protocol on the node device 104 such that the commissioning application 112 may generate and execute the configuration commands in a suitable command protocol that the node device 104 may understand. For example, in some embodiments, the common command protocol may include a TL1 command protocol or a CLI command protocol, but the present disclosure is not limited thereto.

A network configuration command template may be selected according to the solicited platform type at block 525. For example, in some embodiments, the commissioning application 112 may select a suitable command script according to the solicited platform type to compile and generate the network configuration command set for configuring the node device 102. In some embodiments, the hardware being commissioned and a network/topology model may be further considered when selecting the suitable command script. Accordingly, the commissioning application 112 may generate a network configuration command set according to the command template and the solicited configuration information at block 530, and may automatically execute the network configuration command set to configure the node device 104 (e.g., the controller 318 thereof) with the solicited network configuration information at block 535.

In some embodiments, an execution report may be generated at block 540, and the method 500 may end. For example, in some embodiments, the commissioning application 112 may generate an execution result for each of the executed commands in the network configuration command set. In some embodiments, as described above, the execution report may be stored in the field device 102 (e.g., via the storage device 314), and may be subsequently uploaded to the provider management system 114 when the field device 102 establishes a connection with the provider management system 114. In some embodiments, the commissioning application 112 may enable the field technician to email the execution report (e.g., to a remote tester and/or the like), such that the email may be automatically sent once the field device 102 is connected to the provider management system 114 or another suitable external network (e.g., the Internet).

Figure 7:
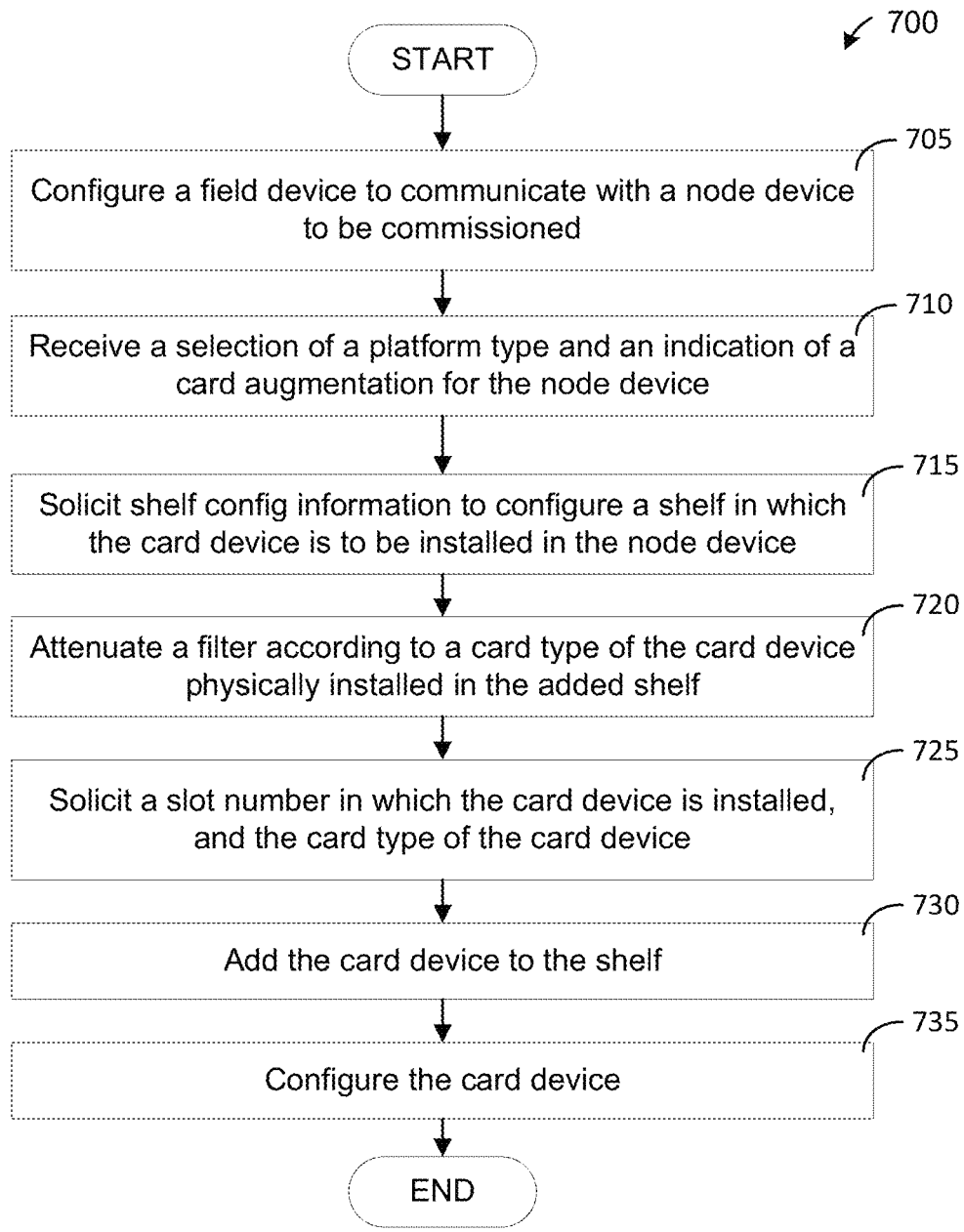
FIG. 7 illustrates a flow diagram of a method of configuring a shelf of the node device for a card device to be installed therein according to one or more embodiments of the present disclosure.
Figure 9:
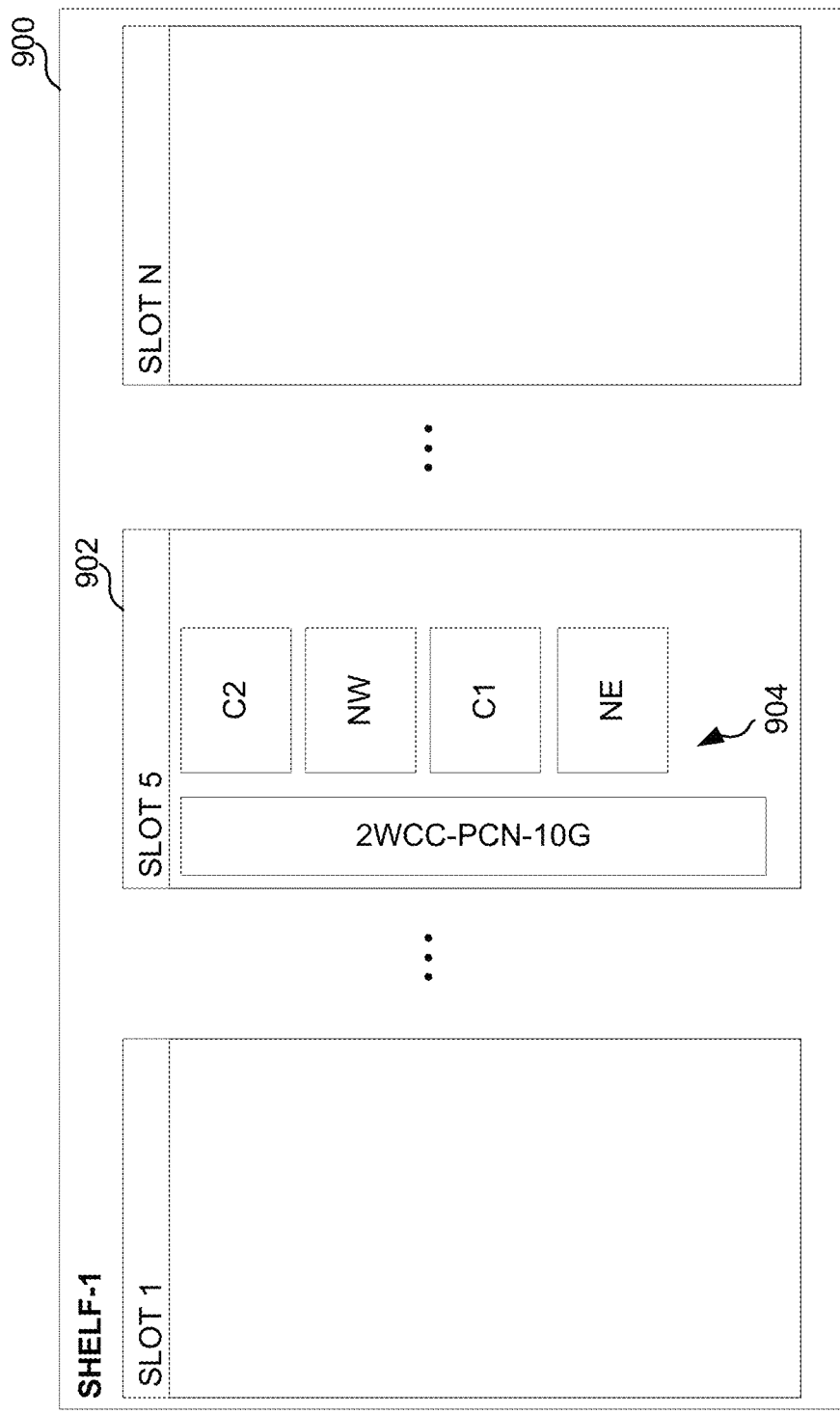
FIG. 9 illustrates a page flow of a graphical user interface of a commissioning application according to the method of FIG. 7.

FIG. 7 illustrates a flow diagram of a method of configuring a shelf of the node device for a card device to be installed therein according to one or more embodiments of the present disclosure. FIG. 8 illustrates a filter attenuation table according to one or more embodiments of the present disclosure. FIG. 9 illustrates a page flow of a graphical user interface of a commissioning application according to the method of FIG. 7. However, the present disclosure is not limited to the sequence or number of operations of the method 700 shown in FIG. 7, and can be altered into any desired sequence or number of operations as recognized by a person having ordinary skill in the art. For example, in some embodiments, the order may vary, or the method 700 may include fewer or additional operations. Further, the operations shown in the method 700 may be performed sequentially, or at least some of the operations thereof may be performed concurrently (e.g., simultaneously or substantially simultaneously).

Referring to FIG. 7, the method 700 may be performed, for example, by the commissioning application 112 as part of a method of augmenting a wavelength of capacity of the node device 104 by installing and configuring one or more card devices in the node device 104. For example, the method 700 may start, and a field device 102 may be configured to communicate with a node device 104 to be configured at block 705. For example, as discussed above, the field technician may have physically connected the field device 102 to the node device 104 using the cable 110, and may initiate the commissioning application 112 from the field device 102 to communicate with the node device 104 via the cable 110. The operation of block 705 may be the same or substantially the same as (or similar to) the operation of block 505 described above with reference to FIG. 5, and thus, redundant description thereof may not be repeated. However, it should be appreciated that the operation of block 705 may be omitted, for example, if the field device 102 is already connected to communicate with the node device 104 after configuring the node device with the network configuration information described above with reference to FIG. 5.

A selection of a platform type and an indication of a card augmentation for the node device 104 may be received at block 710. For example, in some embodiments, the GUI 402 may present a page flow to the field technician to solicit a platform type of the node device 104 being commissioned, which may be the same or substantially the same as the page flow presented during the operation of block 510 of the method 500 described above with reference to FIG. 5, and thus, redundant description thereof may not be repeated. However, instead of providing the platform type for a new network node configuration as in the method 500 of FIG. 5, the GUI 402 may enable the field technician to indicate that the commissioning is for a card augment of the selected platform type.

Shelf configuration information may be solicited to configure a shelf in which the card device is to be installed in the node device 104 at block 715. For example, in some embodiments, the GUI 402 may present a page flow to the field technician to solicit the shelf configuration information for the particular node device 104 being commissioned. The shelf configuration information may include configuration information for configuring the shelf of the node device 102 to receive the card device to be installed therein, and thus, may include at least a shelf type and a shelf number. For example, in some embodiments, the GUI 402 may provide a drop-down menu including a plurality of shelf types that the field technician may select from according to a platform type of the node device 102 being commissioned (e.g., according to a vendor/platform combination). In this case, human errors may be further reduced, for example, by prevented errors that may be caused when the field technician incorrectly manually types an incorrect shelf type in the GUI 402 for a node device being commissioned, but the present disclosure is not limited thereto. For example, in other embodiments, the GUI 402 may present a list of shelf types (e.g., as links or as buttons) that the field technician may select from, and/or a data field to enable the field technician to manually enter the shelf type of the node device 104 in which the card device is to be installed.

Accordingly, the node device 104 may be configured with the shelf configuration information of the shelf in which the card device is too be installed, such that the card device may be physically installed and configured in the shelf of the node device 102. In some embodiments, the GUI 402 may generate a graphical representation (e.g., see 902 in FIG. 9) of the added shelf, such that the field technician may easily determine the card devices that are installed or too be installed in the added shelf of the node device 104. Once the node device 102 has been configured with the shelf configuration information, the card device and corresponding transceiver (e.g., such as XFPs) may be physically installed in the configured shelf of the node device 104 by the field technician, and may be automatically configured using the commissioning application 112 according to solicited information.

Accordingly, after the card device and transceiver have been physically installed in the configured shelf of the node device 104, a filter may be attenuated according to a card type of the card device that is physically installed in the added shelf at block 720. A filter is a passive device that multiplexes/demultiplexes multiple wavelengths into a single composite optical signal. It may be desirable for the incoming signals to have the same optical power, and thus, attenuation may be used to lower signal strength as needed or desired. For example, the filter may be attenuated according to an attenuation table 800 shown in FIG. 8 and the card type of the installed card device. The attenuation table 800 may identify the required signal strength and the size that the physical attenuator needs to be.

A slot number of the shelf in which the card device is installed, and the card type of the card device may be solicited at block 725. For example, in some embodiments, the GUI 402 may provide a drop-down menu including a plurality of card types that the field technician may select from according to a platform type of the node device 102 being commissioned (e.g., vendor/platform combination). In this case, human errors may be further reduced, for example, by prevented errors that may be caused when the field technician incorrectly manually types an incorrect card type in the GUI 402 for a given node device, but the present disclosure is not limited thereto. For example, in other embodiments, the GUI 402 may present a list of card types (e.g., as links or as buttons) that the field technician may select from, and/or a data field to enable the field technician to manually enter the card type of the node device 104 in which the card device is installed.

The card device may be added to the shelf at block 730. For example, as shown in FIG. 9, the GUI 402 may generate a configured shelf view page flow 900 including a graphical representation of the added shelf 902 according to the operation of block 715 described above, and a graphical representation of the added card device 904 according to the solicited card type of the card device. In some embodiments, the configured shelf view page flow 900 may include a graphical representation of each of the slots of the shelf, as well as each of the card devices, if any, installed in the slots of the shelf. Thus, the field technician may easily identify and select the card devices that may still need to be configured from the configured shelf page flow 900. Thus, the card device may be configured at block 735, and the method 700 may end. For example, in some embodiments, the operations to configure the card device at block 735 may be performed according to the method 1000 of FIG. 10, which will be described in more detail hereinafter.

Figure 10:
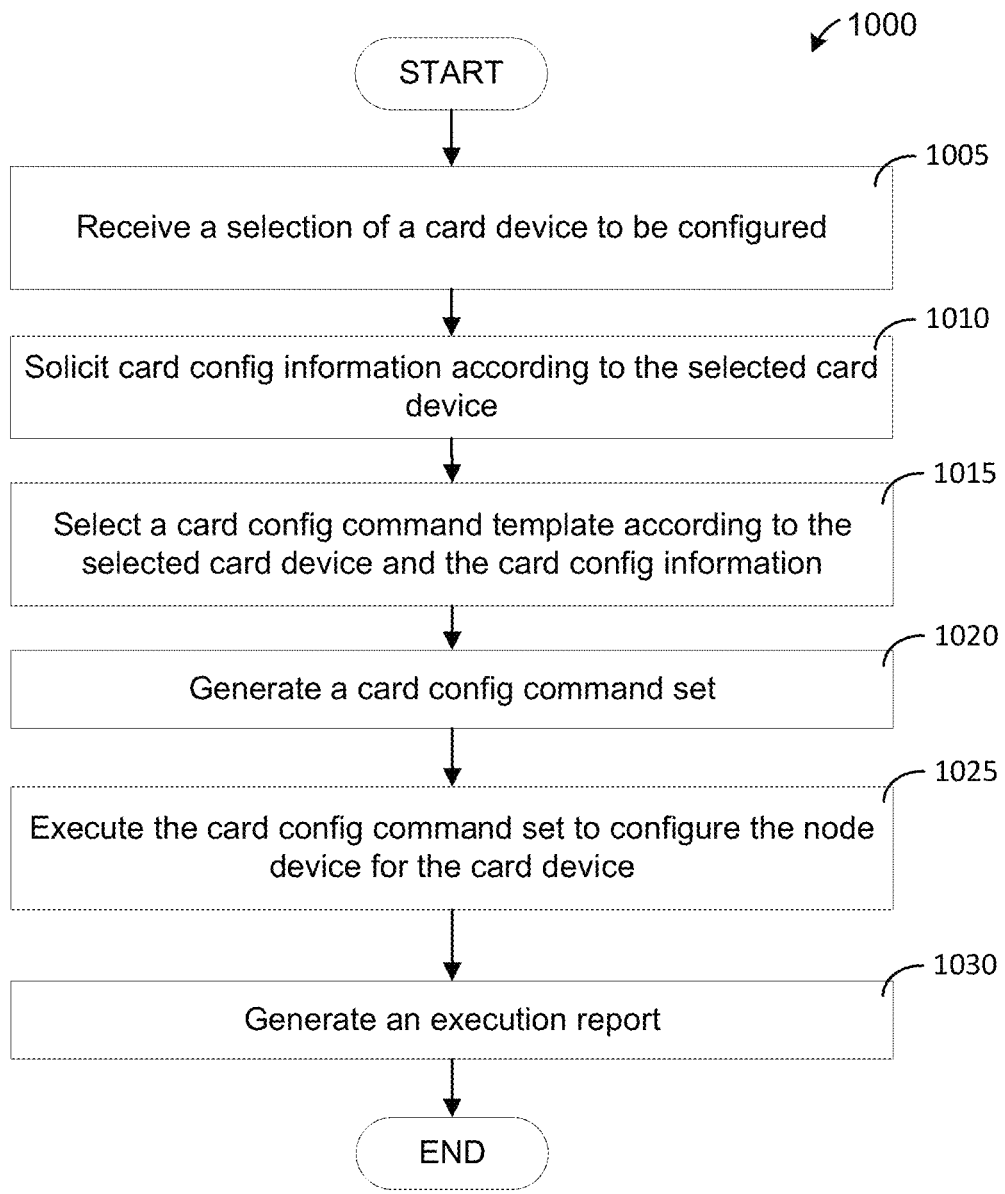
FIG. 10 illustrates a flow diagram of a method of configuring a card device installed in the node device according to one or more embodiments of the present disclosure.
Figure 11:
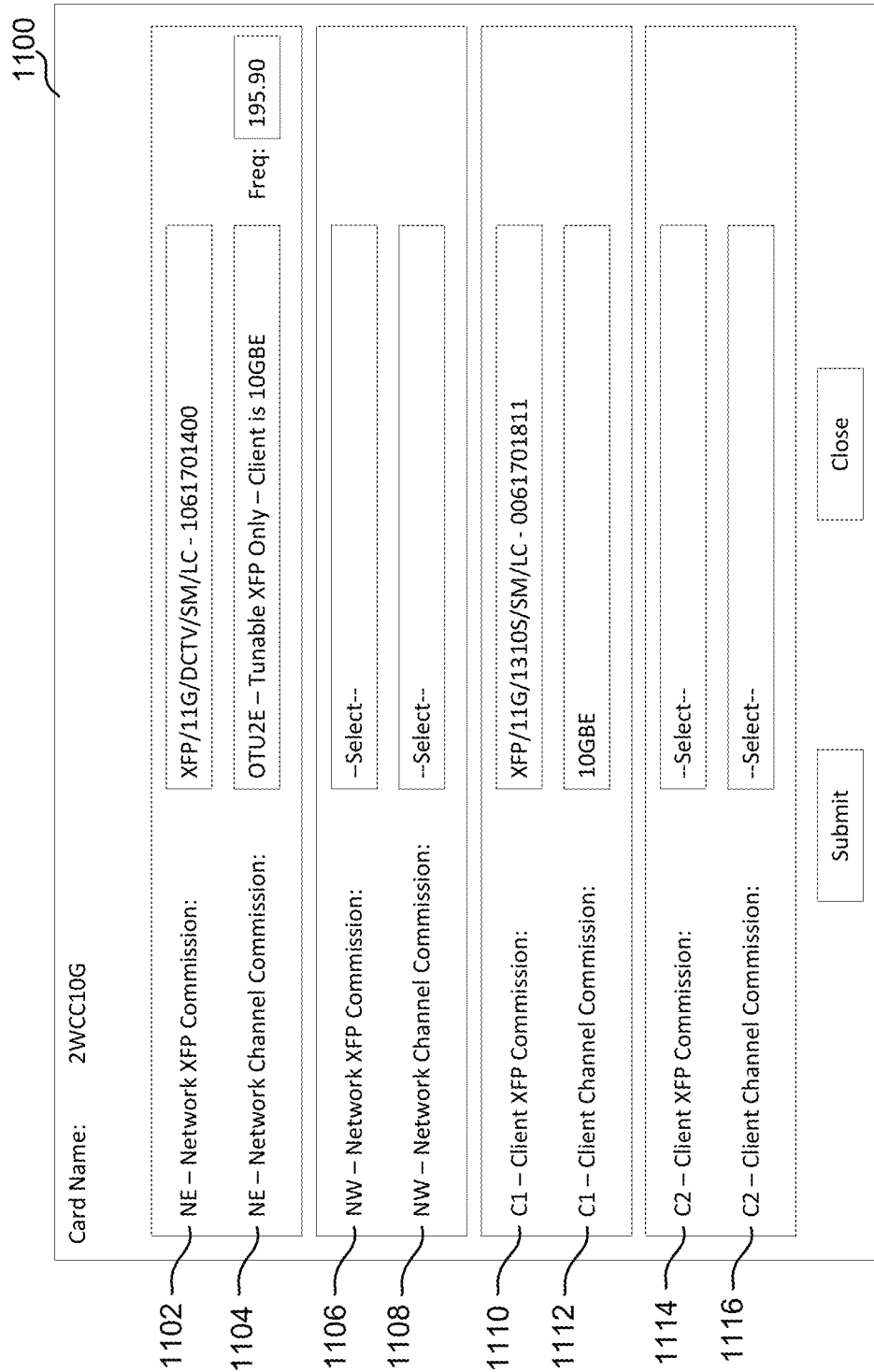
FIG. 11 illustrates a page flow of a graphical user interface of a commissioning application according to the method of FIG. 10.

FIG. 10 illustrates a flow diagram of a method of configuring a card device installed in the node device according to one or more embodiments of the present disclosure. FIG. 11 illustrates a page flow of a graphical user interface of a commissioning application according to the method of FIG. 10. However, the present disclosure is not limited to the sequence or number of operations of the method 1000 shown in FIG. 10, and can be altered into any desired sequence or number of operations as recognized by a person having ordinary skill in the art. For example, in some embodiments, the order may vary, or the method 1000 may include fewer or additional operations. Further, the operations shown in the method 1000 may be performed sequentially, or at least some of the operations thereof may be performed concurrently (e.g., simultaneously or substantially simultaneously).

Referring to FIG. 10, the method 1000 may be performed, for example, by the commissioning application 112 to configure the card device that has been physically installed in the shelf of the node device 104 to augment a capacity of the node device 104. For example, in some embodiments, after the card device is added to the shelf according to the method 700 described above with reference to FIG. 7, the method 1000 may start, and a selection of a card device to be configured that is physically installed in the shelf of the node device 104 may be received at operation 1005. For example, in some embodiments, the field technician may select the graphical representation of the card device 902 in the configured shelf view page flow 900 (e.g., see FIG. 9) in order to configure the selected card device.

Card configuration information may be solicited according to the selected card device at operation 1010. For example, in some embodiments, as shown in FIG. 11, the GUI 402 may present a card configuration page flow 1100 to the field technician to solicit the card configuration information to configure the selected card device. In some embodiments, the card configuration information that is solicited from the card configuration page flow 1100 may be used to automatically configure the node device 104 for the card device, and thus, different information may be solicited according to the selected card device (e.g., according to the card type of the selected card device). For example, according to the selected card device in the non-limiting example shown in FIG. 11, the solicited card configuration information may include a transceiver type 1102, 1106, 1110, and 1114, a service type 1104, 1108, 1112, and 1116, and/or the like. In the non-limiting example shown in FIG. 11, NE, NW, C1, and C2 are network and client ports specific to a single card on one platform. XFP is the equipment commissioning and Channel is the wavelength/customer service commissioning. These commands may modify configuration of both the node device 104 and the installed card device. However, the present disclosure is not limited thereto.

The card configuration information solicited from the card configuration page flow 1100 may be used to automatically generate and execute a set of card configuration commands to configure the node device 104 for the card device. As shown in FIG. 11, the card configuration page flow 1100 may present a plurality of data fields in which the field technician may simply enter the solicited information, rather than having to manually type and execute each of the card configuration commands from a command prompt, a command line, or the like. Accordingly, training time may be decreased, commissioning time may be decreased, and human errors may be reduced.

A card configuration command template may be selected according to the selected card device and the card configuration information at block 525. For example, in some embodiments, the commissioning application 112 may select a suitable command script according to the selected card device and the solicited card configuration information to compile and generate the card configuration command set for configuring the node device 102 for the card device. Accordingly, the commissioning application 112 may generate a card configuration command set according to the command template and the solicited card configuration information at block 1020, and may automatically execute the card configuration command set to configure the node device 102 for the card device according to the solicited card configuration information at block 1025.

In some embodiments, an execution report may be generated at block 1030, and the method 500 may end. For example, in some embodiments, the commissioning application 112 may generate an execution result for each of the executed commands in the card configuration command set. In some embodiments, as described above, the execution report may be stored in the field device 102 (e.g., via the storage device 314), and may be subsequently uploaded to the provider management system 114 when the field device 102 establishes a connection with the provider management system 114. In some embodiments, the commissioning application 112 may enable the field technician to email the execution report (e.g., to a remote tester and/or the like), such that the email may be automatically sent once the field device 102 is connected to the provider management system 114 or another suitable external network (e.g., the Internet).

Figure 12:
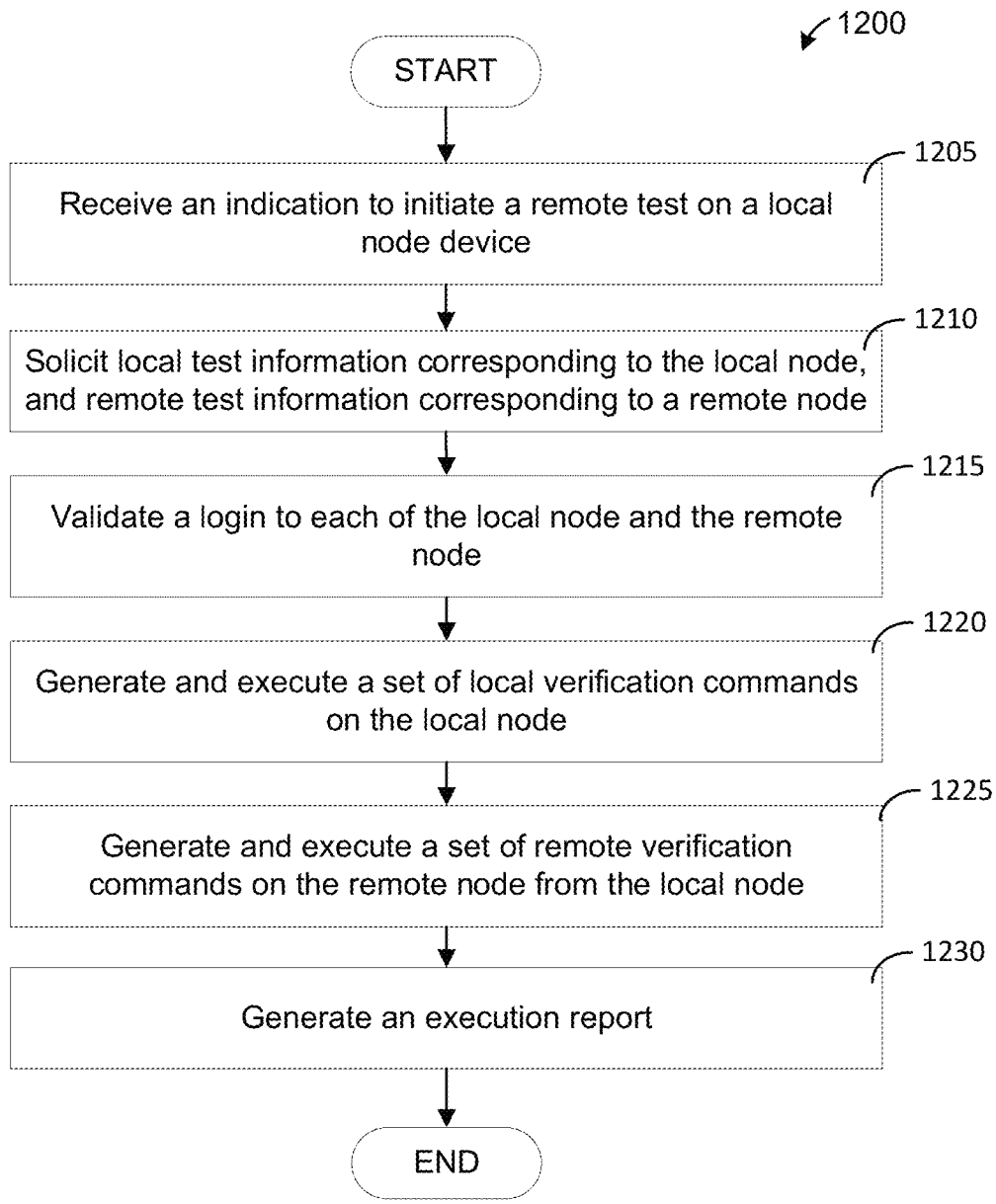
FIG. 12 illustrates a flow diagram of a method of conducting a remote test from the node device according to one or more embodiments of the present disclosure.
Figure 13:
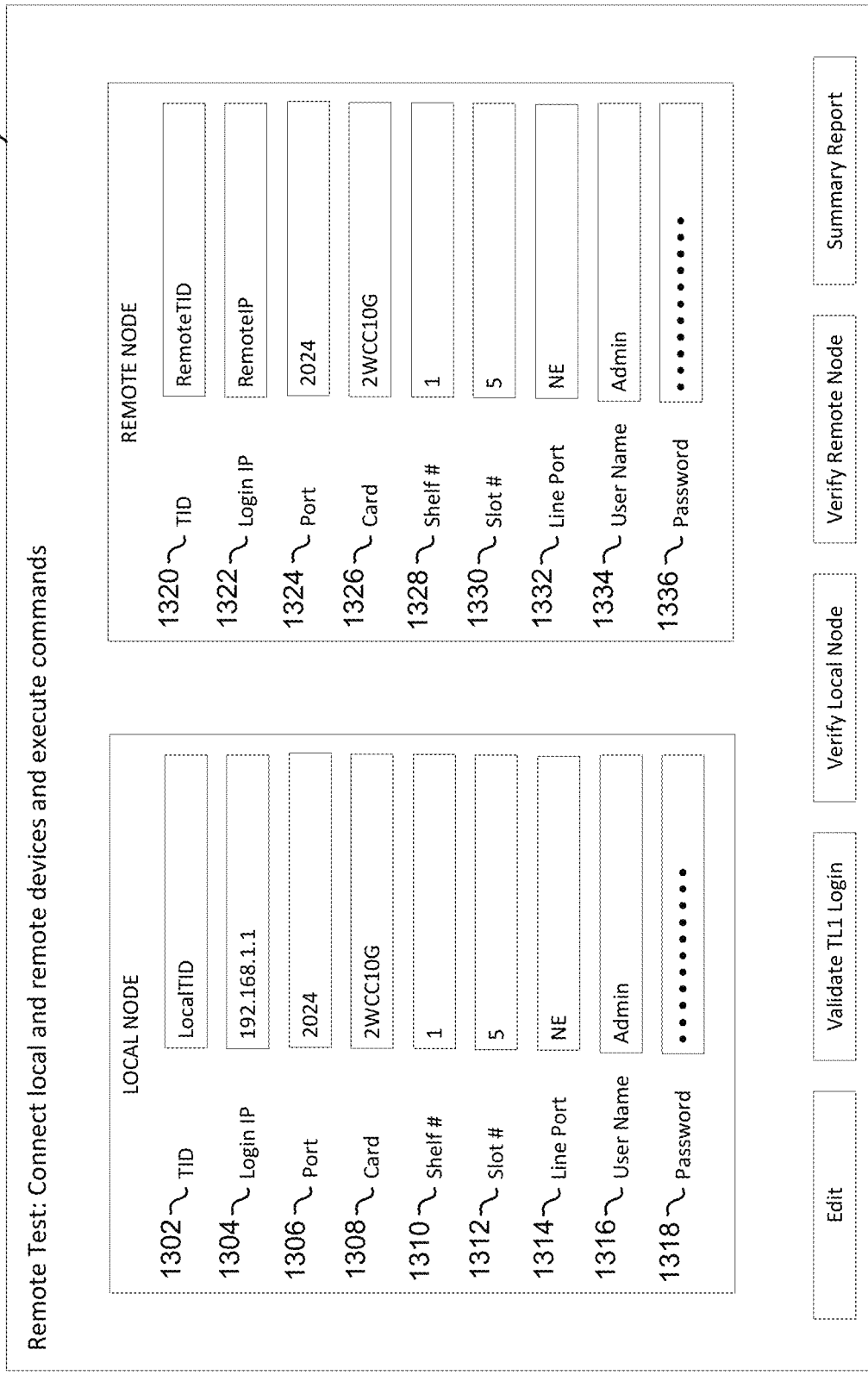
FIG. 13 illustrates a page flow of a graphical user interface of a commissioning application according to the method of FIG. 12.

FIG. 12 illustrates a flow diagram of a method of conducting a remote test from the node device according to one or more embodiments of the present disclosure. FIG. 13 illustrates a page flow of a graphical user interface of a commissioning application according to the method of FIG. 12. However, the present disclosure is not limited to the sequence or number of operations of the method 1200 shown in FIG. 12, and can be altered into any desired sequence or number of operations as recognized by a person having ordinary skill in the art. For example, in some embodiments, the order may vary, or the method 1200 may include fewer or additional operations. Further, the operations shown in the method 1200 may be performed sequentially, or at least some of the operations thereof may be performed concurrently (e.g., simultaneously or substantially simultaneously).

Referring to FIG. 12, the method 1200 may be performed, for example, by the commissioning application 112 to remotely test, from a local node (e.g., a node device that is physically connected to the field device 102 via the cable 110), light levels between the local node and a remote node (e.g., another one of the network devices 106a, 106b, and 106c that has already been commissioned in the first network 108). For example, after the node device 104 has been commissioned in the first network 108 (e.g., according to the method 500 and/or the method 1000), the field technician may use the commissioning application 112 to remotely login to the remote node from the newly commissioned node device 104 (e.g., the local node), and check light levels between the remote node and the newly commissioned node device 104. Accordingly, the method 1200 may start, and an indication to initiate a remote test on a local node device (e.g., the newly commissioned node device 104) may be received at operation 1205. For example, in some embodiments, the field technician may select a remote test button, link, or the like on the GUI 402 to initiate the remote test from the newly commissioned node device 104.

Local test information corresponding to the local node (e.g., the newly commissioned node device 104), and remote test information corresponding to the remote node may be solicited at block 1210. For example, in some embodiments, as shown in FIG. 13, the GUI 402 may present a remote test configuration page flow 1300 to the field technician to solicit the local test information and the remote test information for the local node and the remote node, respectively. As shown in FIG. 13, in some embodiments, the local test information may include a TID 1302, a login IP 1304, a port number 1306, a card type 1308, a shelf number 1310, a slot number 1312, and a line port 1314 of the local node for the remote test, and login information (e.g., a user name 1316 and password 1318) to enable the commissioning application 112 to login to the local node and configure the local node for the remote test. Similarly, in some embodiments, the remote test information may include a TID 1320, a login IP 1322, a port number 1324, a card type 1326, a shelf number 1328, a slot number 1330, and a line port 1332 of the remote node for the remote test, and login information (e.g., a user name 1334 and password 13338) to enable the commissioning application 112 to remotely login to the remote node from the local node to configure the remote node for the remote test. However, the present disclosure is not limited thereto.

The local test information and the remote test information solicited from the remote test configuration page flow 1300 may be used to automatically generate and execute sets of verification commands on the local node and the remote node, respectively, to configure each of the local node and the remote node for the remote test. As shown in FIG. 13, the remote test configuration page flow 1300 may present a plurality of data fields in which the field technician may simply enter the solicited information, rather than having to manually type and execute each of the verification commands from a command prompt, a command line, or the like. Accordingly, training time may be decreased, commissioning time may be decreased, and human errors may be reduced.

A login to each of the local node and the remote node may be validated at block 1215. For example, in some embodiments, the commissioning application 112 may automatically generate and execute login commands on each of the local node and the remote node according to the login information of the local test information and the remote test information to login to each of the local node and the remote node.

A set of local verification commands may be generated and executed on the local node at block 1220, and a set of remote verification commands may be generated and executed on the remote node from the local node at block 1225. For example, in some embodiments, the commissioning application 112 may automatically generate and execute the set of local verification commands on the local node according to the solicited local test information, and may automatically generate and execute the set of remote verification commands on the remote node from the local node according to the solicited remote test information.

In some embodiments, an execution report may be generated at block 1230, and the method 1200 may end. For example, in some embodiments, the commissioning application 112 may generate an execution result for each of the executed commands in the local verification commands and the remote verification commands. In some embodiments, as described above, the execution report may be stored in the field device 102 (e.g., via the storage device 314), and may be subsequently uploaded to the provider management system 114 when the field device 102 establishes a connection with the provider management system 114. In some embodiments, the commissioning application 112 may enable the field technician to email the execution report (e.g., to a remote tester and/or the like), such that the email may be automatically sent once the field device 102 is connected to the provider management system 114 or another suitable external network (e.g., the Internet).

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A nontransitory computer readable medium of a field device, storing instructions that, when executed by a processor of the field device, cause the field device to:
   login to a local node device physically connected to the field device;
   enable a common command protocol on the local node device;
   solicit information to configure the local node device;
   determine a platform type of the local node device;
   generate, based on the platform type of the local node device, a command set in the enabled common command protocol according to the solicited information;
   execute the command set to automatically commission the local node device to communicate with one or more other node devices commissioned in a first network;
   receive an indication to initiate a remote test from the local node device;
   solicit local test information corresponding to the local node device, and remote test information corresponding to a remote node device from among the one or more other node devices commissioned in the first network;
   validate a login to each of the local node device and the remote node device;

generate and execute a set of local verification commands on the local node device based on the solicited local test information; and
generate and execute a set of remote verifications commands on the remote node device from the local node device based on the solicited remote test information.

2. The nontransitory computer readable medium of claim 1, wherein the instructions further cause the field device to select a command template according to the platform type, wherein the command set is generated based on the selected command template.

3. The nontransitory computer readable medium of claim 1, wherein the instructions further cause the field device to generate an execution report in response to executing the command set.

4. The nontransitory computer readable medium of claim 3, wherein the instructions further cause the field device to:
store an inventory corresponding to the execution report of the commissioned node device in a storage device of the field device; and
reconcile the inventory with an external inventory system in response to the field device establishing a connection to the external inventory system.

5. The nontransitory computer readable medium of claim 1, wherein the first network is a fiber optics network, and the local node device is commissioned to transmit light to the one or more other node devices over fibers of the first network.

6. The nontransitory computer readable medium of claim 5, wherein the local node device is a dense wavelength division multiplexing network device.

7. The nontransitory computer readable medium of claim 1, wherein the field device is physically connected to the node device via a universal cable.

8. The nontransitory computer readable medium of claim 7, wherein the universal cable is a CAT-5 cable.

9. The nontransitory computer readable medium of claim 1, wherein the solicited information comprises network configuration information, and
wherein the instructions further cause the field device to:
select a network configuration command template according to a platform type of the local node device;
generate a network configuration command set according to the selected network configuration command template and the network configuration information; and
execute the network configuration command set to configure a controller of the node device with the network configuration information.

10. The nontransitory computer readable medium of claim 1, wherein the solicited information comprises card configuration information, and
wherein the instructions further cause the field device to:
receive a selection of a card device to be configured in the local node device, the card device being physically installed in a shelf of the local node device;
select a card configuration command template according to the selected card device;
generate a card configuration command set according to the selected card configuration command template and the card configuration information; and
execute the card configuration command set to augment a capacity the node device based on the installed card device.

11. A method, executed by a field device, comprising:
logging into a local node device physically connected to the field device;
enabling a common command protocol on the local node device;
soliciting information to configure the local node device;
determining a platform type of the local node device;
generating a command set in the enabled common command protocol according to the solicited information;
executing the command set to automatically commission the local node device to communicate with one or more other node devices commissioned in a first network;
receiving an indication to initiate a remote test from the local node device;
soliciting local test information corresponding to the local node device, and remote test information corresponding to a remote node device from among the one or more other node devices commissioned in the first network;
validating a login to each of the local node device and the remote node device;
generating and executing a set of local verification commands on the local node device based on the solicited local test information; and
generating and executing a set of remote verifications commands on the remote node device from the local node device based on the solicited remote test information.

12. The method of claim 11, further comprising:
selecting a command template according to the platform type,
wherein the command set is generated based on the selected command template.

13. The method of claim 11, further comprising:
generating an execution report in response to executing the command set;
storing an inventory corresponding to the execution report of the commissioned node device in a storage device of the field device; and
reconciling the inventory with an external inventory system in response to the field device establishing a connection to the external inventory system.

14. The method of claim 11, wherein the solicited information comprises network configuration information, the method further comprising:
selecting a network configuration command template according to a platform type of the local node device;
generating a network configuration command set according to the selected network configuration command template and the network configuration information; and
executing the network configuration command set to configure a controller of the local node device with the network configuration information.

15. The method of claim 11, wherein the solicited information comprises card configuration information, the method further comprising:
receiving a selection of a card device to be configured in the local node device, the card device being physically installed in a shelf of the local node device;
selecting a card configuration command template according to the selected card device;
generating a card configuration command set according to the selected card configuration command template and the card configuration information; and
executing the card configuration command set to augment a capacity the local node device based on the installed card device.

16. A field device, comprising:
at least one processor; and memory, operatively connected to the at least one processor and storing instructions that, when executed by the at least one processor, cause the field device to:
  login to a local node device physically connected to the field device;
  enable a common command protocol on the local node device;
  solicit information to configure the local node device;
  determine a platform type of the local node device;
  generate, based on the platform type of the local node device, a command set in the enabled common command protocol according to the solicited information;
  execute the command set to automatically commission the local node device to communicate with one or more other node devices commissioned in a first network;
  receive an indication to initiate a remote test from the local node device;
  solicit local test information corresponding to the local node device, and remote test information corresponding to a remote node device from among the one or more other node devices commissioned in the first network;
  validate a login to each of the local node device and the remote node device;
  generate and execute a set of local verification commands on the local node device based on the solicited local test information; and
  generate and execute a set of remote verifications commands on the remote node device from the local node device based on the solicited remote test information.

17. The field device of claim 16, wherein the solicited information comprises network configuration information, and
  wherein the instructions further cause the field device to:
    select a network configuration command template according to a platform type of the local node device;
    generate a network configuration command set according to the selected network configuration command template and the network configuration information; and
    execute the network configuration command set to configure a controller of the node device with the network configuration information.

* * * * *